United States Patent [19]

Pelletier

[11] Patent Number: 4,904,201
[45] Date of Patent: Feb. 27, 1990

[54] TELECOMMUNICATIONS CONNECTOR

[75] Inventor: Claude Pelletier, Laval, Canada

[73] Assignee: Northern Telecom Limited, Montreal, Canada

[21] Appl. No.: 324,156

[22] Filed: Mar. 16, 1989

[51] Int. Cl.$^4$ ............................................. H01R 13/54
[52] U.S. Cl. ................................... 439/352; 439/372; 439/482
[58] Field of Search ............... 439/357, 358, 352, 353, 439/354, 345, 347, 289, 824, 912, 482

[56] References Cited

U.S. PATENT DOCUMENTS

| | | | |
|---|---|---|---|
| 3,711,816 | 1/1973 | Schumacher | 439/352 |
| 4,083,619 | 4/1978 | McCormick et al. | 439/352 X |
| 4,265,503 | 5/1981 | Baur | 439/352 X |

FOREIGN PATENT DOCUMENTS

| | | | |
|---|---|---|---|
| 17842 | 3/1956 | Fed. Rep. of Germany | 439/372 |
| 1934752 | 1/1971 | Fed. Rep. of Germany | 439/912 |
| 2801427 | 7/1978 | Fed. Rep. of Germany | 439/372 |
| 1292774 | 3/1962 | France | 439/482 |
| 547881 | 2/1977 | U.S.S.R. | 439/372 |

Primary Examiner—William Briggs
Attorney, Agent, or Firm—R. J. Austin

[57] ABSTRACT

Telecommunications conductor having a dielectric housing, a conductive blade member extending from the housing for insertion into an insulation displacement terminal of a terminal array and a latch extending from the housing for mounting the connector on a terminal member which carries the array. A positive latch operating device is employed to flex the latch into a latching position from which it is resiliently urged into a normal unlatched position. Preferably, these are two opposed latches and the operating device is a cam rotatable upon the housing.

7 Claims, 4 Drawing Sheets

TELECOMMUNICATIONS CONNECTOR

This invention relates to telecommunications connector.

In the telecommunications industry, distribution frames are used for the distribution of conductor wires of an outside cable to a customer's telephone network and thus to access terminals for telecommunications equipment, such as telephones or data processing terminals. These distribution frames carry planar connectors which have an array of insulation displacement terminals. Any displacement terminal of any array may be connected, as desired, to an insulation displacement terminal of any other array of another connector in the same or in any other distribution frame, or to an access terminal. Such connections are normally made by inserting an insulated conductor wire into the chosen insulation displacement terminal, the act of insertion stripping the insulation locally from the conductor wire so that the bared conductor physically contacts the insulation displacement terminal.

A distribution frame as referred to above may be of the construction of frame referred to as a "module" in U.S. Pat. No. 4,278,315, granted July 14, 1981 in the name of B. T. Osborne. The planar connectors may be of a construction referred to as "cross-connect connectors" in that each connector comprises a dielectric terminal carrier with two spaced arrays of insulation displacement terminals. The terminals of one row are interconnected electrically and in desired fashion with those of the other row through the carrier. The construction of cross-connect connectors may be as referred to as "connector block" in U.S. Pat. No. 4,295,703, granted Oct. 20, 1981 in the name of B. T. Osborne.

More recently, and for certain applications, conductor wire insertion has been replaced with bridging links for connecting a desired terminal of a terminal array with a terminal directly beneath it and in another terminal array. The bridging links have two electrically connected conductive blade members which are inserted within the chosen insulation displacement terminals so as to electrically connect them. Alternatively, patch cords having connectors at each end, each provided with conductive blade members are used to connect together other chosen insulation displacement terminals of different arrays. Apart from this, conductors to be used as test probes also have conductive blade members for insertion within chosen insulation displacement terminals.

In all of these more recent constructions, i.e. bridging links, patch cords, or test probe connectors, latches are used to hold them assembled onto the terminal carrier. These latches oppose each other across the associated blade member and are resiliently sprung so as to be urged resiliently apart during acceptance of a terminal carrier between them whereby the latches are accepted in grooves of the carrier in a resiliently urged apart condition. Such a method of mounting is usually acceptable, but problems have been found to arise after continual mounting and removal of the connectors, as may occur with the test probe connectors. Continued operation of the latches has been found to increase their plasticity at the expense of their resiliency so that they gradually reduce their grip upon terminal carriers until the gripping action of the latches becomes extremely unreliable.

The present invention seeks to provide a telecommunications connector construction for assembly onto a terminal carrier which avoids or minimizes the above problem.

According to the present invention there is provided a telecommunications connector for connection to an insulation displacement terminal of a terminal array, the connector comprising a dielectric housing, at least one electrically conductive blade member extending from one side of the housing, latch means extending from said one side of the housing for mounting the connector on a terminal member carrying the terminal array, and positive moving means for flexing the latch means into a latching position and for allowing for its release from the latching position.

With the connector according to the invention, the latch means are thus not resiliently sprung into the latching position as is the case with the recently developed connectors. In contrast, the latch means of the invention require a means for causing movement into the latching position. Thus, where the latch means comprises a pair of latches in an embodiment of the invention, then in a preferred arrangement, these latches are resiliently urged out of the latching position so that their resilient movement into the latching position is required by the positive moving means. Hence, it follows that the operation of the latch means of the present invention is directly opposite from that of the recently developed connectors referred to above.

In a basic form of the invention, the latch means may comprise a single latch and the positive moving means may comprise a cam rotatably mounted upon the housing and operably engaging the latch for moving it into its latching position. Alternatively, and as referred to above, in a preferred arrangement the latch means comprises two latches. These latches extend from the one side of the body with the blade member disposed between the latches. A cam is associated with each latch and the cams are operable to move the latches towards one another and towards the blade member and into the latching position.

One embodiment of the invention will now be described, by way of example, with reference to the accompanying drawings, in which.

Figure 1:
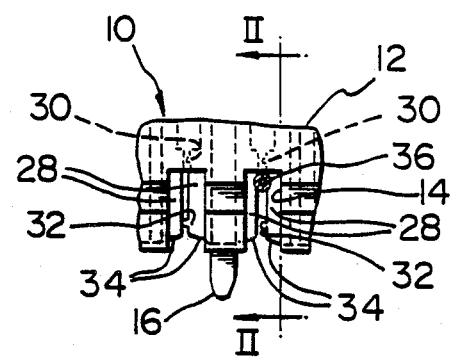
FIG. 1 is a plan view of a prior art planar connector provided with two planar rows of insulation displacement terminals.
Figure 2:
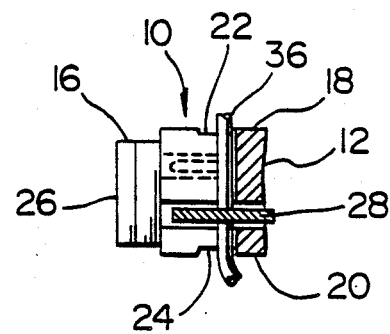
FIG. 2 is a cross-sectional view through the terminal of FIG. 1 taken along line II—II in FIG. 1.
Figure 3:
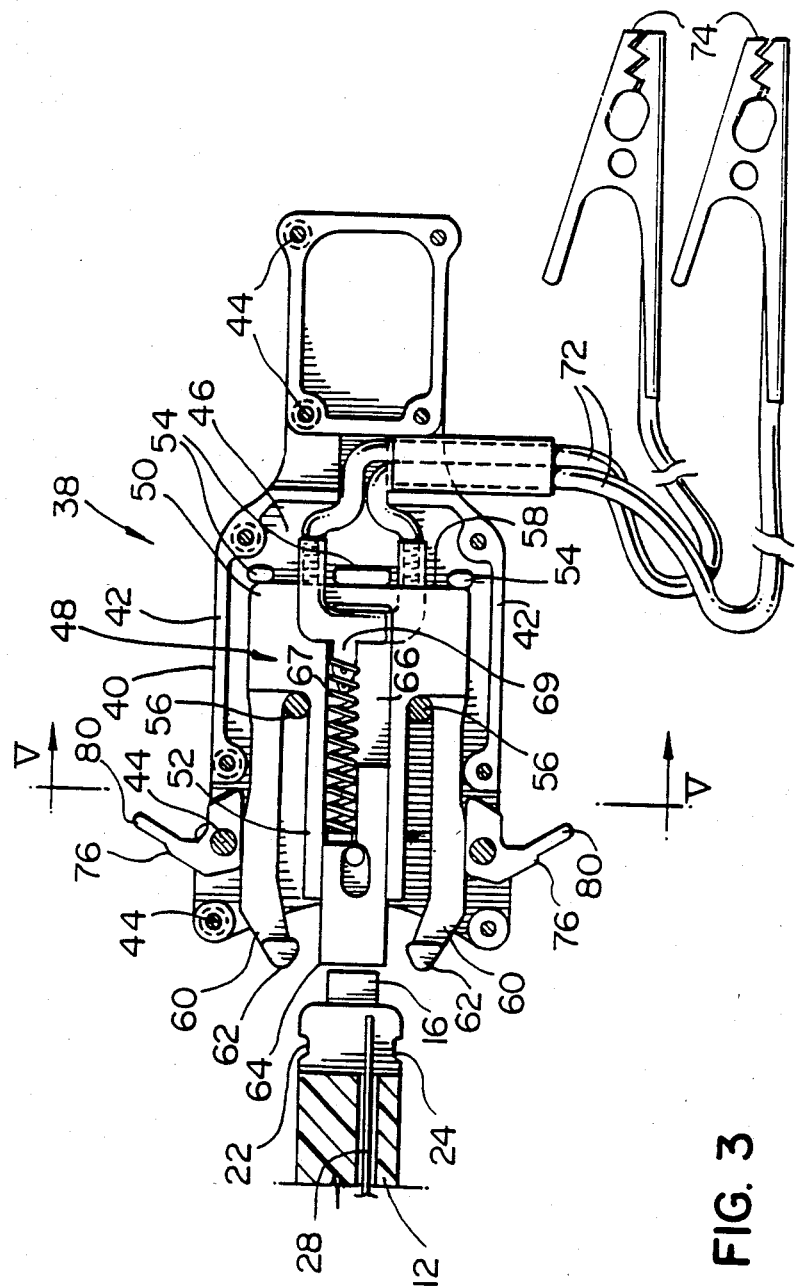
Figure 4:
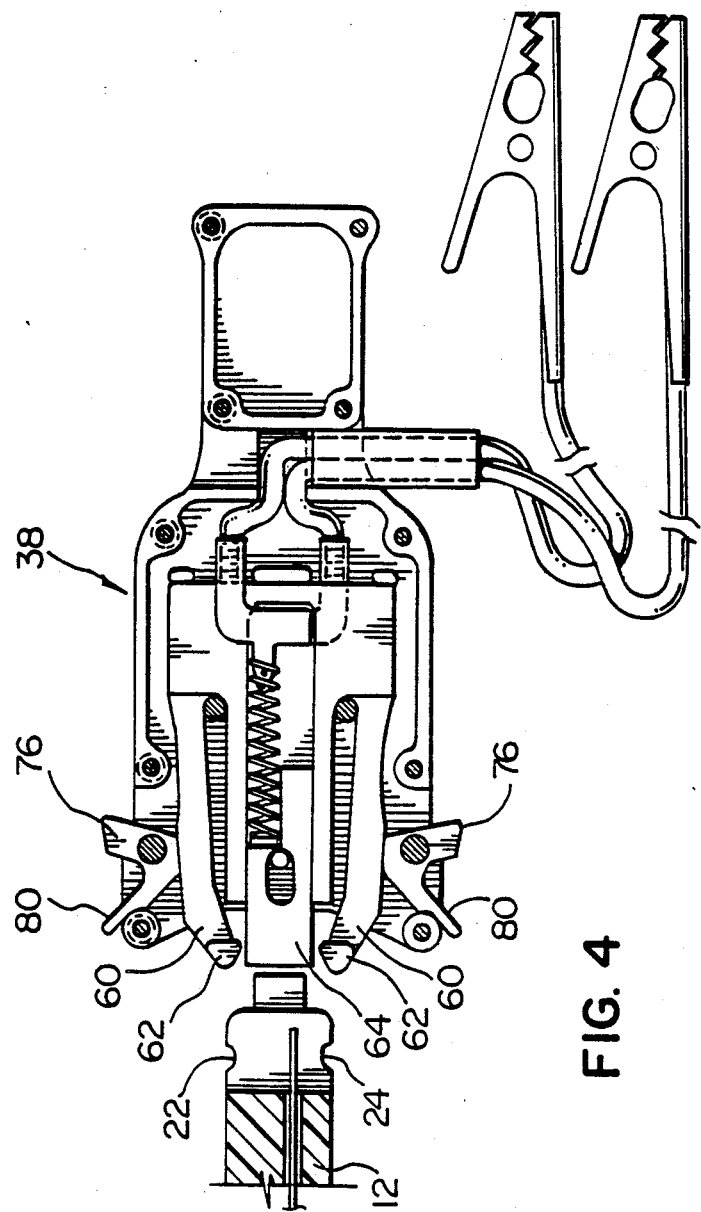
Figure 5:
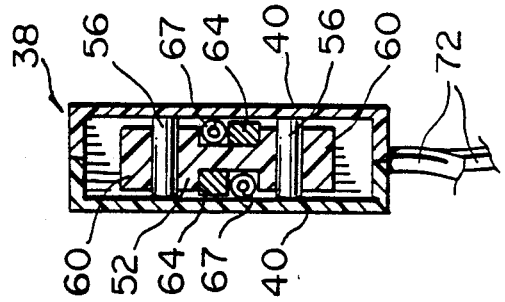
Figure 6:
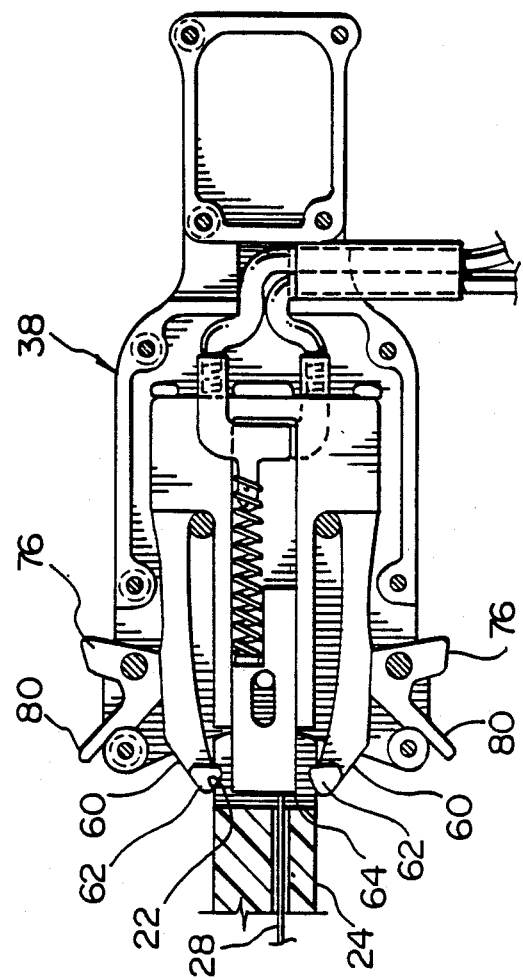

FIG. 3, on a smaller scale than FIGS. 1 and 2, is a longitudinal cross-sectional view through a connector according to the embodiment, showing the connector being offered up to and before mounting upon a prior art connector such as shown in FIGS. 1 and 2;

FIG. 4 is a view similar to FIG. 3 and showing parts of the connector in different positions;

FIG. 5 is a cross-sectional view through the connector of the embodiment taken along line IV—IV in FIG. 3; and FIG. 6 is a view similar to FIG. 3 and showing the connector of the embodiment mounted upon the prior art connector.

A prior art connector 10 of planar construction and for mounting in a prior art distribution frame (not shown) is shown in FIGS. 1 and 2. This prior art connector is of a construction normally referred to as a BIX (Registered Trade Mark of Northern Telecom Limited) terminal assembly, commonly referred to as a cross-connect connector which is of the construction described in U.S. Pat. No. 4,295,703. The connector 10 comprises an elongate dielectric terminal carrier 12 having a rectilinear array of vertically extending slots 14 provided in two longitudinally extending edges of the terminal carrier. In FIGS. 1 and 2, one edge only of the carrier 12 is shown. Slots 14 are in pairs and a finger 16 projects forwardly between the individual slots of each pair. Upper and lower faces 18 and 20 (FIG. 2) of the carrier 12 include upper and lower longitudinally extending recesses 22 and 24 respectively, disposed rearwardly from a forward edge 26 of the carrier. Each of the recesses 22 and 24 is interrupted along its length by the slots 14.

The terminal carrier 12 carries an array of insulation displacement terminals along each longitudinally extending edge of the carrier, the terminals each comprising a pair of contact arms 28 which extend from within the carrier 12 and project forward into the respective slot 14. One of the arms 28 includes a preload projection 30 which engages the other arm to spring the arms slightly apart, and a strain relief projection 32 which is located forward of the preload projection and which projects towards the other arm. Each arm also includes a cutting edge 34 at its forward end adjacent the cutting edge of the opposite arm. The arms 28 may be resiliently deflected in opposite lateral directions within the terminal carrier so as normally to accommodate an insulated conductor wire 36 between them. The conductor wire may extend from within an insulation displacement terminal as shown in FIGS. 1 and 2 and into an insulation displacement terminal of another array of terminals provided upon another terminal assembly.

When it is required to test any of the terminals, a test probe connector 38 of the embodiment shown in FIG. 3 onwards may be used. As shown in FIGS. 3 and 4, the test probe connector 38 comprises a housing of left- and right-handed parts 40 formed with edge flanges 42, which abut, with the housing parts assembled together by rivets 44. As shown particularly in FIG. 5, the housing parts define a chamber 46 and this chamber accommodates both a latch means to be described and also an electrical conductor means also to be described.

The latch means is an integral one-piece construction of dielectric material and comprises a body 48 which has a wide rear portion 50, and a narrow forwardly facing portion 52. The body 48 is retained in position within the chamber 46 by plastic lugs 54 of the housing parts 40 and two rivets 56 extending between the housing parts, the lugs and rivets preventing front and rear and lateral movement of the body in the plane of FIG. 3. As may be seen particularly from FIG. 3, the lugs 54 engage a rear face 58 of the body 48 while the rivets 56 engage into opposite corners of the body at a position where the narrow portion merges into the wide portion 50. The latch means also comprises two latches 60 which extend forwardly from the wide portion 50 of the body, the latches being spaced apart with the narrow portion 52 of the body between them. Each latch has a free end formed by a head 62 which projects slightly in a lateral direction towards the other latch. As shown particularly by FIG. 3, the rivets 56 also engage one side edge of the latches adjacent their bases.

The electrical conductor means comprises two electrically conductive blade members 64 which project forwardly between the two heads 62 of the latches and from the narrow portion 52 of the body. The conductive blade members 64 are slidably mounted within side grooves 66 of the body 48 (see particularly FIG. 5), and are urged forwardly by electrically conductive compression springs 67 (FIG. 3) which at their other ends conductively surround a spigot 69 extending from L-shaped conductive members 68. The conductors 68 are electrically connected to bared conductor wire ends of the insulated wires 72 which extend from between the housing parts and are connected to two conventional ring clip connectors 74 normally used in the electrical industry for making electrical connection to electrical terminal posts or other bared wires.

The latch means is molded so that the latches 60 are sprung apart in a normal unstrained condition as shown in FIG. 3. In this condition, as can be seen from FIG. 3, the heads 62 of the latches are too far apart to locate within the recesses 22 and 24 of the carrier 12 so that the carrier is free to move between the heads 62.

To move the latches into a position engaging within the recesses 22 and 24, a positive moving means is provided. This positive moving means comprises, in respect of each latch, a cam member 76 which is pivoted between the housing parts 40 by one of the rivets 44. As shown in FIG. 3, the cams are oppositely disposed at the two sides of the housing. Each cam is suitably shaped so that with the cam in the full outline position shown in FIG. 3, each latch assumes its outward or normally unstrained position. However, as shown in FIG. 4, with each cam rotated to another position, the cam has forced the latch inwardly towards the blade member 64, i.e. towards the other latch. Each latch is provided with a projecting lever 80 which is manually operable to move the latch the positions of FIGS. 3 and 4. As can be seen from FIG. 4, with the latches in their inward positions without a carrier 12 located between the latches, then the latches close towards each other to a position close to the blade member 64 and come closer together than the distance between the bottoms of the recesses 22 and 24.

In use of the connector 38, the levers 80 are initially disposed in the outer positions shown in FIG. 3. A connector 10 is then inserted between the latches, i.e. in the direction of the arrows in FIG. 3, so that the two blade members 64 each becomes located between a pair of contact arms 28 of an insulation displacement terminal. The blade members 64 initially ride rearwardly within the groove 66 of the body 48 against the compression spring 66 which then urges the blade members 64 forwardly between the contact arms of the insulation displacement terminals as shown by FIG. 7. Upon the connector 38 being disposed in its desired position upon the connector 10, the cam members 76 are rotated into their positions in FIG. 4 so that the heads 62 of the latches move into the recesses 22 and 24. As can be seen from FIG. 6, the heads 62 of the latches 60 terminate their inward movement upon their engagement with the bottoms of the recesses. However, this occurs while the cam members are still being rotated and the latches 60 become resiliently flexed by the cam members 76 urging them inwardly at a position between the fixed ends of the latches and the heads 62. As a result the intermediate parts of the latches become slightly resiliently bowed towards the narrow portion 52 of the body 48. With the cam surfaces engaging the latches extremely close to the heads 62, then considerable force is exerted upon the latches to maintain engagement within the recesses.

It follows from the above description, that the engagement of the connector 10 between the latches does not force the latches apart to cause engagement. In contrast, the normal position of the latches allows for insertion of the connector 10 between them without engagement by the latches. The latches subsequently need to be moved resiliently inwards so as to provide a positive latching engagement within the recesses. Engagement is provided by a significant locking action by operation of the cam members coacting with the latches so that dependence is not placed merely upon the natural resiliency of the latches to hold them in the locking positions. Of course should it be required to remove the connector 38 from the connector 10, it is a simple matter to operate the cam members 76 so as to enable the latches to return to their widest positions apart to remove the heads from the recesses 22 and 24.

What is claimed is:

1. A telecommunications connector for connection to an insulation displacement terminal of a terminal array, the connector comprising a dielectric housing, at least one electrically conductive blade member extending from one side of the housing, a latch means extending from said one side of the housing for mounting the connector on a terminal member carrying the terminal array, the latch means comprising at least one resilient latch and a cam member is associated with the latch, the cam member being rotatable upon the housing and operably engaging the latch for flexing the latch into a latching position and for allowing for release of the latch from the latching position.

2. A connector according to claim 1 wherein the housing comprises two housing members which are assembled together around the latch means and the blade member.

3. A connector according to claim 1 wherein the latch means comprises two latches extending from said one side of the housing with the blade member extending from the housing in a position between the latches and two cam members are provided, one associated with each latch, the cam members operable to move the latches towards one another and towards the blade member and into the latching positions.

4. A connector according to claim 3 wherein the latch means also includes a body and each latch is integrally formed with the body as a cantilever extension, each latch is normally in an unstrained condition removed from its latching position, and the associated cam member is operable to resiliently flex the latch into its latching position.

5. A connector according to claim 2 wherein the latch means comprises two latches and a body which carries the blade member, the latches extending as resilient cantilever extensions integral with the body and also the latches extending from within the housing with the blade member disposed between the latches, and the cam members associated with the latches are operable to move the latches towards one another and towards the blade member and into the latching position.

6. A connector according to claim 5 wherein each latch is normally in an unstrained position removed from its latching position and the associated cam member resiliently flexes the latch into its latching position.

7. A connector according to claim 5 wherein, in respect of each latch, the associated cam member is rotatable between the two housing members and operably engages the latch.

* * * * *